Jan. 21, 1936. C. F. SILSBY 2,028,416
MANUFACTURE OF SULPHURIC ACID
Filed May 4, 1933
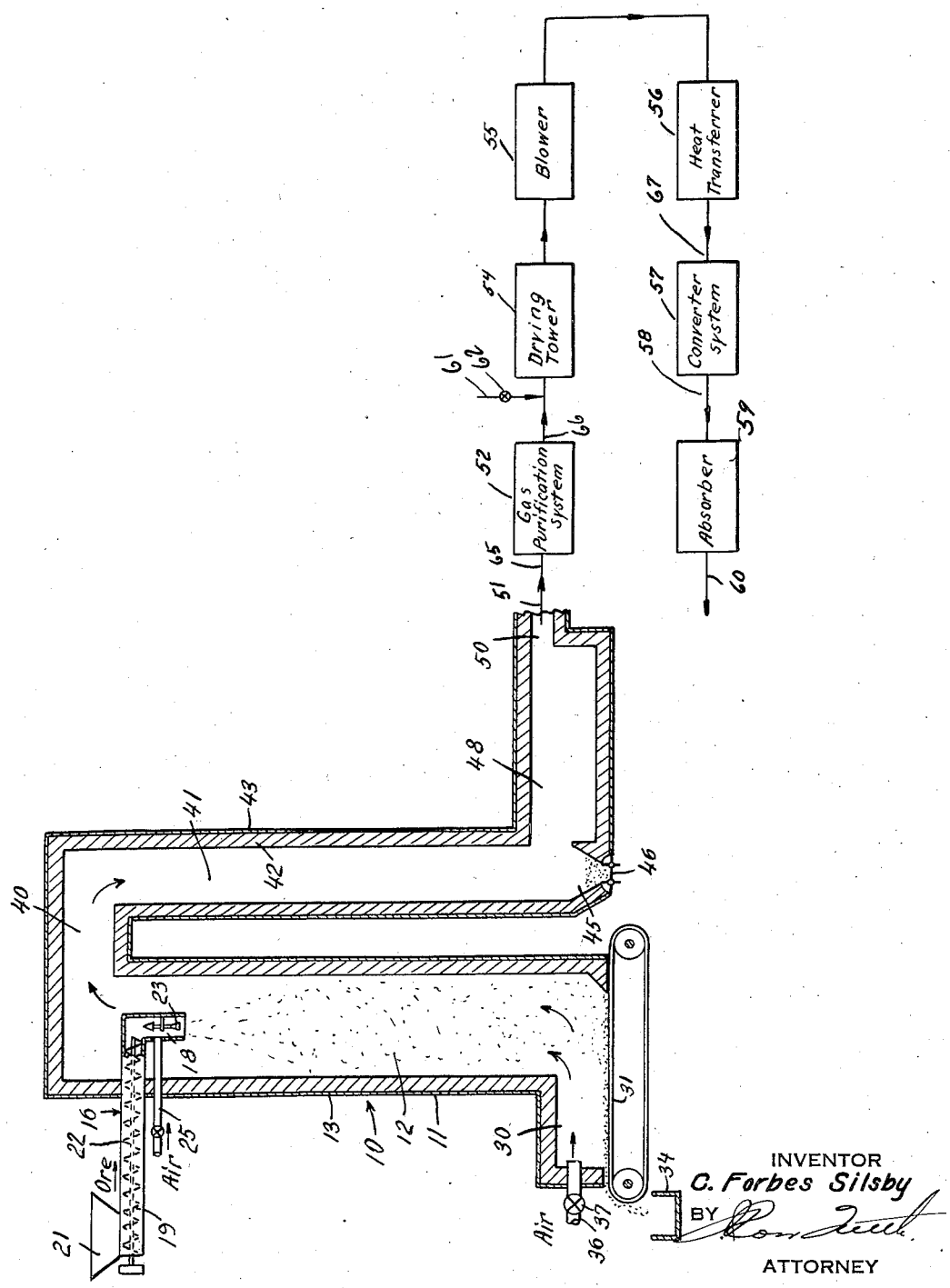
INVENTOR
*C. Forbes Silsby*
BY
ATTORNEY Patented Jan. 21, 1936

2,028,416

UNITED STATES PATENT OFFICE 2,028,416

MANUFACTURE OF SULPHURIC ACID

Charles Forbes Silsby, White Plains, N. Y., assignor to General Chemical Company, New York, N. Y., a corporation of New York Application May 4, 1933, Serial No. 669,391

3 Claims. (Cl. 23—175)

This invention relates to the manufacture of sulphuric acid by the contact process. More particularly, the invention is directed to the manufacture of sulphuric acid by catalytic oxidation of sulphur dioxide formed by roasting metallic sulphides.

In the manufacture of sulphuric acid, production of sulphur dioxide gases by roasting metallic sulphides, and utilization of the gases formed for conversion to sulphuric anhydride are well known. As a general rule, the present practice in roasting finely divided metallic sulphides includes the use of mechanically operated multiple hearth furnaces, such for example as the well known MacDougal, Herreshoff and Wedge burners. While such burners provide effective roasting of sulphide fines and are employed for this purpose to a large extent, the complicated construction and operation thereof involve considerable initial and maintenance expense.

To overcome operating disadvantages inherent in mechanical burners, it has been suggested to roast the fines while in gaseous suspension by methods in which the fines are either injected into a roasting chamber in suspension in an oxidizing gas or are showered downwardly into the roasting chamber wherein the fines encounter cross or counter currents of suspending gas. It has also been proposed to use sulphur dioxide gases produced in suspension roasting for the manufacture of sulphuric acid by the contact process.

In the production of sulphuric acid, suspension roasting of metallic sulphides, as a source of sulphur dioxide gas, may be employed to best advantage when the metallic sulphides are in a relatively finely divided state, and this method of roasting presents several advantages over the mechanical hearth operation by considerably lowering costs because of the elimination of the involved and expensive rabbling and other mechanism present in mechanical burners. However, in adapting suspension roasting to the production of sulphur dioxide gas for use in the manufacture of sulphuric acid, difficulties are encountered which must be overcome before the theoretical advantages of this type of roasting operation are made practicably available. Such difficulties involve maintenance of control conditions in the suspension roaster so as to secure commercially satisfactory desulphurization of the fines, and at the same time to produce a sulphur dioxide gas of such nature as to be readily adaptable for conversion to sulphur trioxide by the contact process.

One of the principal objects of the present invention lies in the provision of a method for the manufacture of sulphur trioxide by catalytic oxidation by means of which method sulphur dioxide gases produced by suspension roasting of metallic sulphide fines may be advantageously employed, and by which suspension roasting of the fines on the one hand, and purification and conversion of the resulting gases on the other are so coordinated as to make economically available for utilization in the manufacture of sulphuric acid, by the contact process, the sulphur dioxide gases produced by roasting of metallic sulphides. Further objects of the invention involve the provision of methods by which commercially improved desulphurization of the sulphide fines may be obtained, at the same time producing a sulphur dioxide gas of such sulphur dioxide concentration and oxygen content as may be readily purified and prepared for oxidation to sulphur trioxide.

In accordance with the invention, it has been found that by conducting the suspension roasting of finely divided metallic sulphides in such manner as to produce a combustion zone exit gas having the hereinafter specified amount of free oxygen, the metallic sulphide fines may be substantially completely desulphurized, maximum efficiency of the roasting operation per se obtained, and a sulphur dioxide gas produced which, by reason of its composition makes possible economic purification and preparation for catalysts and economic conversion to sulphuric acid by the contact process.

In carrying out one preferred embodiment of the process of the invention, finely divided metallic sulphides, such as iron pyrites are fed into and dispersed in the upper end of a roasting chamber, and permitted to fall to the bottom of the roasting chamber through a rising current of combustion supporting gas such as air. Roasting conditions are so controlled that the sulphide fines ignite substantially immediately on introduction into the top of the roasting zone, and so that oxidation of the fine particles is substantially complete when the fines drop onto the hearth in the bottom of the roasting chamber. Air for supporting combustion is introduced into the roasting zone at the bottom, and the gaseous products of combustion are withdrawn from the top. The roaster operates under negative pressure induced by a blower in the system. The lower end of the roasting chamber is constructed so as to effect discharge of cinder, and to permit introduction into the lower end of the combustion chamber of air in quantities to furnish oxygen for roasting the ore, and to provide the desired amount of free oxygen in the roaster exit gases. The sulphur dioxide gases produced, the characteristics of which will be hereinafter more fully described, after leaving the roaster are passed through a dust chamber, and thence through a gas purification system. After drying, the gases are then preheated to optimum initial conversion temperature, and the gas stream passed into and through a converter system in which the sulfur dioxide gas is oxidized to sulphur trioxide. The converter exit gases are then run through an absorbing system to recover sulphur trioxide and produce sulphuric acid.

The nature and advantages of the invention may be more clearly understood from a consideration of the following description taken in connection with the accompanying drawing showing, partly in section and partly diagrammatically, a sulphuric acid plant.

Referring to the drawing, the reference numeral 10 indicates a shaft burner comprising a shell 11, constructed of suitable refractory material such as firebrick or the like, defining an elongated roasting chamber 12 substantially circular in cross section. A steel casing 13 surrounds shell 11 and acts to support and reinforce the same.

Near the upper end of the shell is an ore feed mechanism designated generally by 16. The particular construction of the ore feeder forms no part of the invention, since any suitable type of injector may be employed for introducing finely divided sulphides into the top of the combustion chamber and forming therein a dispersion of the ore. In the apparatus illustrated, the injector 16 includes an ore inlet conduit 18 positioned in the vertical center and near the top of the roasting chamber or zone 12. Sulphide fines are fed into conduit 18 by a screw conveyor 19 which, on rotation carries fines from bin 21 through conduit 22 into the upper end of the conduit 18. The latter may be provided with one or more axially disposed dispersing cones 23. Air or other gas may be fed into inlet 18 in controlled quantities through a pipe 25, the latter being preferably connected tangentially to the casing of conduit 18 so as to effect a whirling motion of the gas therein. Those portions of the injector mechanism and pipe 25 within the roasting chamber may be water jacketed to avoid the destructive effects of high roasting temperatures.

The lower end of the shaft roaster is built with an enlarged chamber 30 having in the bottom a hearth 31, which may be of the traveling chain grate type, arranged to discharge cinder from the furnace into a suitable receptacle or conduit 34. The bulk of the air employed to support oxidation in the chamber 12 and to provide the desired amount of free oxygen in the burner exit gas is introduced into the bottom of the combustion zone through a conduit 36 controlled by valve 37.

The top of the combustion chamber communicates, through conduit 40, with the upper end of a dust settling chamber 41 comprising a refractory brickwork shell 42 and an exterior reinforcing steel casing 43. The settling chamber 41, approximately of the same vertical dimension as the roasting chamber 12, is formed with a hopper-shaped bottom 45 terminating in an opening equipped with air-locks 46 by means of which cinder may be discharged from the chamber 41 without admission of air. The lower end of chamber 41 opens into a horizontally elongated chamber 48 in which further quantities of dust may be settled out of the gas stream.

The gas outlet 50 of chamber 48 communicates through line 51 with a gas purification system 52. The gas purification system may be of any suitable construction, for example as shown in the Herreshoff U. S. Patents 940,595, November 16, 1909, and 1,113,437, October 13, 1914. Such system may include wet scrubbing towers, gas coolers, and coke box filters, or equivalent apparatus. The exit gas of the purification system is drawn through drying tower 54 by blower 55, and pumped through heat transferrers 56, and thence into the converter system 57 in which any suitable catalyst may be employed for effecting oxidation of the sulphur dioxide to sulphur trioxide. The heat transferrer 56 and the converter system 57 may be so related as to effect heating of the incoming gases while in transferrer 56 to the initial optimum conversion temperature by heat generated in the converter system. From the converter system, the sulphur trioxide gases are passed through line 58 into absorber 59 from which product sulphuric acid is withdrawn, the tail gases of the absorber system being discharged into the atmosphere through line 60. Reference numeral 61 indicates a pipe connection, controlled by valve 62, by means of which, under certain conditions of operation, air may be introduced into the gas stream.

The manufacture of sulphuric acid in accordance with the process of the invention may be accomplished by utilizing sulphur dioxide gases formed by suspension roasting of finely divided metallic sulphides such as iron pyrites, pyrrhotite, zinc sulphide and arsenopyrite. For convenience, operation of the preferred embodiments of the improved process for making sulphuric acid will be described in connection with the use of iron pyrites and pyrrhotite as the source of sulphur.

A supply of finely divided ore is maintained in the bin 21 by suitable conveyor or elevator mechanisms not shown. Before roasting is begun, the combustion chamber 12 may be preheated to a temperature above the ignition point of the particular ore to be roasted by means of oil burners inserted through conveniently located workholes not shown. When the desired degree of preheat is obtained, conveyor 19 is rotated from a source of power, and regulated quantities of sulphide fines are fed into the top of the ore inlet conduit 18. To aid in forming a dispersion of fines in the upper end of the roasting chamber, air may be introduced into inlet 18 through valve controlled pipe 25. Air is admitted at this point preferably only to facilitate distribution of ore particles in the upper portion of the roasting chamber. With respect to the amount of air employed to support combustion, the quantity of air admitted through pipe 25 may be considered negligible. Gas such as steam or any other inert gas not detrimental to the roasting operation may be admitted to the feed mechanism through pipe 25. Cones 23 operating in conjunction with the air fed in through pipe 25 effect a dispersion of finely divided sulphide in the top of the combustion chamber 12.

Substantially all of the air employed to support combustion of the ore and to supply the desired amount of free oxygen in the burner exit gas is introduced into the bottom of the roasting chamber 12 through pipe 36, an upward flow of air in the roasting chamber being induced by the blower 55, the quantity of air admitted into the bottom of the roasting chamber being controlled largely by regulation of valve 37. The grate 31 may be constructed so as to permit some leakage of air into the bottom of the roasting chamber, and although appreciable quantities of air may leak in through the grate, for practical purposes ultimate control of the amount of air drawn into the bottom of the combustion chamber may be had by adjustment of valve 37.

After formation of the dispersion of sulphide fines in the top of the combustion chamber, the ore particles drop through the unobstructed roasting chamber and pass through an atmosphere increasingly rich in oxygen. The ore particles may drop in the combustion chamber at a rate approximating that of similar particles falling freely under the influence of gravity. Because of the high temperatures prevailing in the combustion chamber, and due to control of the free oxygen content of the gas as discussed, the fines, on introduction into the top of the roasting zone, are quickly heated to the ignition point. As the ore particles drop through the combustion chamber, roasting proceeds rapidly, the temperature of the roasting operation as a whole being in the neighborhood of say 1700° to 1800° F. or possibly higher, depending upon operating capacity. In the lower part of the combustion chamber, the ore particles enter into an atmosphere containing substantially all air and comparatively no sulphur dioxide. In this zone, oxidation of the cinder becomes substantially complete. During the fall of the fines in the reaction chamber, the sulphur dioxide formed is substantially immediately removed from the ore particles, and as the latter get poorer in sulphur the particles drop into an atmosphere increasingly rich in oxygen, and oxidation of the ore particles more readily proceeds to completion. The roasted particles drop onto the upper surface of moving grate 31 which continuously discharges cinder into a suitable receptacle 34.

The hot sulphur dioxide and oxygen containing gases leave the top of the combustion chamber 12 and pass through conduit 40 into the top of the dust settling chamber 41. During downward movement of the gases through the latter, the gases are cooled to some extent, heavier dust particles separate out and collect in the bottom of the chamber 41 above air locks 46 which from time to time may be operated to discharge collected cinder. The exit gases of chamber 41 enter an enlarged, horizontally disposed dust chamber 48, in which further quantities of dust are settled out, the gases passing thence through line 51 into the head end of the gas purification system 52.

Although the purification system may be of any type effective to bring about whatever purification of the gas may be desired, in the present example, the purification system may include one or more scrubbing towers through which the gas stream to be purified rises vertically upward countercurrent to a downwardly flowing stream of sulphuric acid; coolers in which the exit gas of the scrubbing towers are cooled and moisture condensed; and one or more coke box filters which effect removal of acid mist from the gas stream.

The gas stream after purification is drawn through the drying tower 54 by blower 55, and pumped into the transferrer 56 in which the incoming gas stream is heated to the optimum initial conversion temperature. As above noted, heat of conversion generated in the converter system may be utilized to effect preheating of the incoming gas in the transferrer passing hot exit gases from the converters through the transferrer by pipe connections not shown. The sulphur dioxide is oxidized in the converters to sulphur trioxide by any suitable catalyst, such as a vanadium catalyst. Sulphur trioxide is absorbed in absorber system 59 from which product sulphuric acid is withdrawn. The exit gases of the absorption system are discharged to the atmosphere through line 60.

It will be seen that, in accordance with this invention, the particles of finely divided sulphide ore are caused to pass downwardly through a rising stream of air-sulphur dioxide gas. In a countercurrent roasting operation of this type, the gas stream at the top of the combustion chamber will be largely a sulphur dioxide-nitrogen mixture. It has been found that the efficiency of this type of process, i. e., the degree of desulphurization obtained for a given capacity of operation, is materially increased by controlling the operation so as to provide in the gas stream at the top of the furnace, i. e., at the point where the gas stream leaves the combustion zone and thus the point of last contact of the gas stream with unoxidized ore particles, not less than about 5% free oxygen, which means that the amount of air introduced at the bottom of the furnace should be sufficiently in excess of that required to oxidize the iron and convert the sulphur to sulphur dioxide as will give the specified amount of free oxygen in the gas stream at the top of the combustion chamber, or in other words at the point of last contact of the gas with the ore.

One possible explanation of the materially improved results obtained by control of the oxygen concentration of the gas in the manner indicated is as follows. In suspension roasting, ore particles do not ignite, or begin to burn at a rapid rate until they are in an atmosphere containing a substantial amount of free oxygen. When the ore particles are introduced into a rising stream of $SO_2$ gas containing little or no free oxygen, the ore particles do not burn rapidly until they have fallen downwardly through the furnace to a point where the oxygen concentration (which increases progressively through the combustion chamber) becomes substantial. By providing free oxygen in the gas stream at the top of the combustion chamber, as in the process of the invention, rapid ignition of the ore particles in the upper end of the combustion chamber is promoted, thus aiding in increasing the capacity of the furnace to a very substantial extent.

In roasting operations such as described herein, it will be understood, depending upon factors such as the fineness of the ore burned, the velocity of the upwardly directed gas stream, and the capacity of the roaster, some unburned ore particles may be swept over into chamber 41 and roasting of such particles completed therein, in which case the amount of air admitted to the roaster proper is controlled so that at the point in chamber 41 where oxidation of the ore is substantially complete, there is then in the gas stream the above noted amounts of free oxygen.

In accordance with the invention, the free oxygen content of the sulphur dioxide gas leaving the roasting chamber is further controlled so as not to substantially exceed about 9%. By thus controlling the free oxygen concentration of the gas so as to be preferably not materially above 5%, i. e., within the range 5 to 7% and to not exceed about 9% as a maximum, it has been found that oxidation of the sulphur dioxide to the trioxide in the roasting operation and subsequent dust chambers in which the gas is in contact with iron oxide cinder particles, possessing some catalytic activity, is substantially avoided, thus preventing loss of the sulphur dioxide value of the gas in the purification system where any sulphur trioxide formed is subject to absorption and removal as impure "purification" acid in the scrubbing towers, coolers and coke boxes of the purification system.

In the manufacture of sulphuric acid by the contact process, it is necessary to add to sulphur dioxide gas intended for catalysis sufficient free oxygen to combine with the sulphur dioxide to form sulphur trioxide plus, in general, a certain excess of free oxygen over that theoretically required to combine with the sulphur dioxide, in order to obtain substantially complete conversion of the dioxide to the trioxide as is necessary for satisfactory commercial operation. Inasmuch as at least a theoretically required amount of free oxygen for conversion of the sulphur dioxide to sulphur trioxide must be present in the sulphur dioxide gas before going to the converters, there is no objection from the standpoint of decreasing the capacity of the converter system through air dilution, to introducing this air or oxygen into the roasting chamber where it will perform the important function explained above of materially increasing the efficiency of the roasting operation. On the other hand, it has been found, as explained above, that by controlling the oxygen concentration of the sulphur dioxide leaving the roaster to not exceed about 9%, loss of sulphur values in the purification system is minimized. Hence, when the 5 to 9% of free oxygen in the gas leaving the roasting chamber is not as large as may be desired for satisfactory conversion of the sulphur dioxide to trioxide in the converter system, additional air or oxygen may be introduced into the gas stream, preferably just ahead of the drier, to thereby give the desired sulphur dioxide-oxygen ratio in the gas going to the converters.

In general, for satisfactory operation of the converter system, the gas going to the converters should contain sufficient free oxygen such that after conversion of the sulphur dioxide to sulphur trioxide the converter exit gas will contain about 5% free oxygen, which means, for example, that where the gas going to the converter has a sulphur dioxide content of about 9%, the gas stream should contain not less than about 9.5% oxygen, 4.5% for oxidation of the sulphur dioxide to sulphur trioxide and 5% excess. (This will give slightly more than 5% oxygen in the exit gas from the converter due to the small reduction in volume as the result of the reaction $2SO_2+O_2=2SO_3$.) Hence, in accordance with this invention whereas the roasting operation is controlled such that the sulphur dioxide gas leaving the roasting chamber will contain from about 5% to about 9% free oxygen, any additional free oxygen which may be required for optimum conversion of sulphur dioxide to sulphur trioxide in the converters is added to the gas stream subsequent to the roasting operation, and preferably just ahead of the drying tower preceding the converter system.

When conducting the roasting operation so that the gas stream at the top of the burner contains at least and not materially more than about 5% free oxygen, in addition to minimizing production of "purification" acid in the purification system, the burner exit gas mixture formed has a maximum sulphur dioxide concentration commensurate with maximum desulphurization of the ore. Furthermore, where the sulphur dioxide concentration of the gas is high, dilution of the burner gas by oxygen and inert gases is correspondingly low, the size of the purification system may be reduced sometimes as much as 10–25%. When the capital investment involved in construction and maintenance of the purification system is considered, substantial reduction in the size of the purification system is an item of major importance. In view of the foregoing, it is evident that material operating advantgaes are obtained by carrying out the roasting operation as described.

The following are examples of gas concentrations present in the roaster, and in the purification and converter systems, when operating in accordance with illustrative preferred embodiments of the invention.

When burning pyrites ore and controlling the roasting operation so as to form a gas mixture of maximum sulphur dioxide concentration commensurate with proper desulphurization of the sulphide fines, the gas stream on completion of combustion contained by volume 12.4% sulphur dioxide and 5.0% oxygen. At the head of the purification system, as at 65, the gas contained 12.3% sulphur dioxide and 4.9% oxygen, the sulphur dioxide and oxygen content of the gas stream having been reduced slightly by oxidation of sulphur dioxide to sulphur trioxide. When using the purification system mentioned above, and illustrated for example in the Herreshoff patents, because of leakage of air into the gas stream during passage of same through the gas purification system the gas leaving the purification system at 66 contained 11.5% sulphur dioxide and 5.9% oxygen. With a concentrated gas of this nature, valve 62 was opened to permit admission to the system of sufficient air to bring the sulphur dioxide concentration of the gas mixture entering the converter at 67 to 8.5%, and to provide in the gas stream 9.8% oxygen. On oxidation of a gas stream of this nature, the gas leaving the converters through line 58 contained 5.5% free oxygen.

When burning pyrrhotite, and conducting roasting so as to produce a burner gas having a maximum sulphur dioxide concentration permissible with satisfactory desulphurization of the fines, the gas mixture leaving the combustion zone contained 10% sulphur dioxide and 5.1% oxygen. At 65, the head end of the gas purification system, the gas contained 9.9% sulphur dioxide and 5.1% oxygen, the exit gas of the purification system at 66 containing 9.3% sulphur dioxide and 6.0% oxygen. A gas stream of this nature was diluted with air, admitted through inlet 61, to form a gas at 67 containing 7.5% sulphur dioxide and 8.9% oxygen. After conversion, the converter system exit gas in line 58 contained 5.1% free oxygen.

When operating the burner under different conditions so as to form a sulphur dioxide gas mixture having a slightly lower sulphur dioxide concentration and an amount of free oxygen something more than 5%, the roasting conditions were controlled, when burning pyrites, so that the combustion gas contained 9.5% sulphur dioxide and 8.7% oxygen. At the head end of the purification system, the sulphur dioxide and oxygen content of the gas were reduced because of the oxidation of sulphur dioxide to sulphur trioxide to 9.1% sulphur dioxide and 8.55% oxygen. With a gas of this nature, where the purification system was such that air leaked into the gas stream during purification, the exit gas of the purification system at 66 contained 8.5% sulphur dioxide and 9.3% free oxygen. A gas of this composition was passed directly to the converter system without further dilution with air, the converter exit gas in line 58 containing 5.1% free oxygen.

When burning pyrrhotite under similar conditions, the combustion gases contained 8.5% sulphur dioxide and 7.5% free oxygen. By oxidation of sulphur dioxide to sulphur trioxide, such gas mixture at 65 contained 8.1% sulphur dioxide and 7.3% free oxygen. On account of leakage into the gas stream during purification, the exit gas of the purification system contained 7.5% sulphur dioxide and 8.6% free oxygen. This gas mixture was run directly into the converter system, and the residual gas in line 58 contained 4.8% free oxygen.

I claim:
1. In the method of making sulphur trioxide by the roasting of sulphide ore and conversion of the sulphur dioxide produced to sulphur trioxide by the contact process in which method the sulphide ore falls in an uninterrupted drop through the roasting zone counter-current to a rising stream of air which supports the combustion of the sulphide ore, the improvement which comprises regulating the supply of air admitted to the roasting zone so that the concentration of free oxygen in the sulphur dioxide gas at the point of last contact with the ore is at least 5% and not more than about 9% and introducing the sulphide ore in the roasting zone containing at least 5% free oxygen and causing it to fall through said roasting zone from the said point of last contact through an active oxidation zone becoming gradually richer in oxygen in the direction of fall of the ore particles, whereby burning of the ore is promptly initiated upon introduction and substantially complete desulphurization of the ore is accomplished.

2. The method of making sulphur trioxide by the roasting of sulphide ore and conversion of the sulphur dioxide produced to sulphur trioxide by the contact process which comprises causing finely divided sulphide ore in dispersed condition to fall in an uninterrupted drop through the roasting zone counter-current to a rising stream of air, while regulating the proportion of air and ore admitted to the roasting zone so that the concentration of free oxygen in the sulphur dioxide gas at the point of last contact with the ore is at least about 5 per cent and not more than about 9 per cent, withdrawing the sulphur dioxide gas thus produced from the roasting zone, removing impurities including cinder from the sulphur dioxide gas, adjusting the sulphur dioxide-oxygen content of the gas stream after removal of cinder so as to provide therein reacting proportions of sulphur dioxide and oxygen and catalytically oxidizing the sulphur dioxide to sulphur trioxide.

3. The method of making sulphur trioxide by the roasting of sulphide ore and conversion of the sulphur dioxide produced to sulphur trioxide by the contact process, which comprises causing finely divided sulphide ore in dispersed condition to fall in an uninterrupted drop through the roasting zone counter-current to a rising stream of air, while regulating the supply of air admitted to the roasting zone so that the concentration of free oxygen in the sulphur dioxide gas at the point of last contact with the ore is at least about 5 per cent and not more than about 9 per cent, withdrawing the sulphur dioxide gas thus produced from the roasting zone and removing impurities therefrom, adjusting the sulphur dioxide-oxygen content of the purified gas stream to produce therein reacting proportions of sulphur dioxide and oxygen and an excess of about 5 per cent oxygen and then catalytically oxidizing the sulphur dioxide to sulphur trioxide.

CHARLES FORBES SILSBY.